United States Patent
Ohashi et al.

(10) Patent No.: US 9,130,500 B2
(45) Date of Patent: Sep. 8, 2015

(54) AC MOTOR DRIVE DEVICE

(75) Inventors: Manabu Ohashi, Chiyoda-ku (JP); Kazuya Nakamura, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 34 days.

(21) Appl. No.: 13/981,473

(22) PCT Filed: Mar. 28, 2011

(86) PCT No.: PCT/JP2011/057688
§ 371 (c)(1),
(2), (4) Date: Jul. 24, 2013

(87) PCT Pub. No.: WO2012/131880
PCT Pub. Date: Oct. 4, 2012

(65) Prior Publication Data
US 2013/0307462 A1    Nov. 21, 2013

(51) Int. Cl.
  H02P 3/18  (2006.01)
  H02P 27/06 (2006.01)
  H02P 3/22  (2006.01)
  H02M 1/32  (2007.01)

(52) U.S. Cl.
  CPC  *H02P 27/06* (2013.01); *H02P 3/22* (2013.01); *H02M 1/32* (2013.01); *H02P 2201/03* (2013.01); *H02P 2201/07* (2013.01)

(58) Field of Classification Search
  CPC ...... H05B 1/00; H05B 31/00; H05B 2203/00; H05B 2206/00; H02M 1/00; B60L 1/00; B60L 2200/00; B60L 2210/00
  See application file for complete search history.

(56) References Cited

U.S. PATENT DOCUMENTS

| | | | |
|---|---|---|---|
| 2006/0001318 A1* | 1/2006 | Ahmad et al. | 307/10.1 |
| 2008/0185197 A1* | 8/2008 | Nakamura et al. | 180/65.2 |
| 2009/0058329 A1* | 3/2009 | Ichikawa | 318/139 |

(Continued)

FOREIGN PATENT DOCUMENTS

| JP | 2001074279 | * | 8/1999 |
|---|---|---|---|
| JP | 2001-074279 A | | 3/2001 |

(Continued)

OTHER PUBLICATIONS

Translation of JP 2008141868.*

(Continued)

*Primary Examiner* — Shawki S Ismail
*Assistant Examiner* — Zoheb Imtiaz
(74) *Attorney, Agent, or Firm* — Sughrue Mion, PLLC; Richard C. Turner

(57) ABSTRACT

A circuit disconnection element that can open or short-circuit between a power storage element and a step-up/step-down bidirectional chopper circuit is provided in a power storage system, thereby preventing a self-discharge state in a process of charging. Furthermore, at the time of occurrence of an abnormality, the power storage element is detached from other devices including the step-up/step-down bidirectional chopper circuit. Accordingly, an energy loss of the power storage element at the time of power regeneration can be reduced to improve the energy use efficiency. Further, breakage influences such that the power storage element causes breakage in other devices at the time of occurrence of the abnormality can be prevented, thereby enabling to obtain an AC motor drive device having mounted therein a highly safe power storage system.

13 Claims, 6 Drawing Sheets

(56) References Cited

U.S. PATENT DOCUMENTS

| | | | |
|---|---|---|---|
| 2009/0121659 A1* | 5/2009 | Oyobe et al. | 318/12 |
| 2009/0230899 A1* | 9/2009 | Arimura et al. | 318/400.01 |
| 2011/0127935 A1* | 6/2011 | Gao | 318/400.3 |
| 2012/0242365 A1* | 9/2012 | Singh | 324/762.01 |
| 2013/0063055 A1* | 3/2013 | Araki et al. | 318/376 |
| 2013/0073125 A1* | 3/2013 | Araki et al. | 701/19 |

FOREIGN PATENT DOCUMENTS

| | | | |
|---|---|---|---|
| JP | 2001-103769 A | | 4/2001 |
| JP | 2001-320893 A | | 11/2001 |
| JP | 2004-289950 A | | 10/2004 |
| JP | 2008141868 | * | 1/2006 |
| JP | 2007228644 | * | 2/2006 |
| JP | 2007-228644 A | | 9/2007 |
| JP | 2008-099503 A | | 4/2008 |
| JP | 2008-141868 A | | 6/2008 |

OTHER PUBLICATIONS

Translation of JP 2007228644.*
Translation of JP 2001074279.*
Korean Office Action, mailed May 30, 2014, Korean Patent Application No. 10-2013-7024951.
Taiwanese Office Action, dated Sep. 12, 2013, Application No. 100116102.
Japanese Office Action (Notice of Rejection), mailed Mar. 4, 2014, Application No. 2013-506903.

* cited by examiner

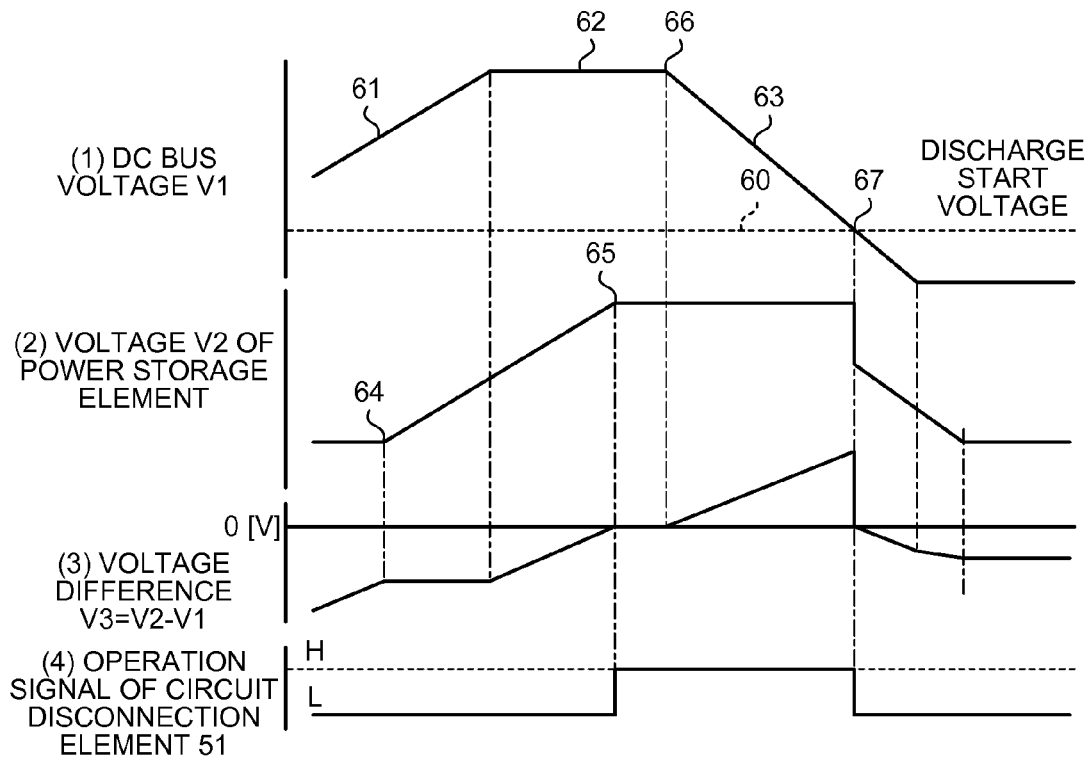
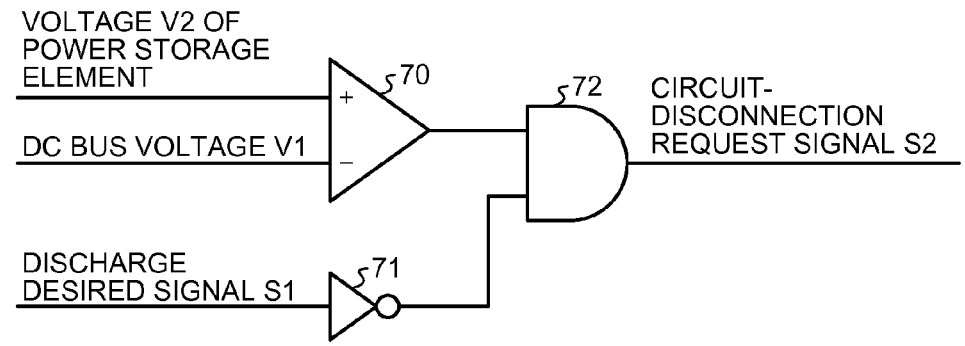

AC MOTOR DRIVE DEVICE

CROSS REFERENCE TO RELATED APPLICATIONS

This application is a National Stage of International Application No. PCT/JP2011/057688 filed Mar. 28, 2011, the contents of all of which are incorporated herein by reference in their entirety.

FIELD

The present invention relates to an AC motor drive device that converts DC power from a DC power source to AC power by an inverter and supplies AC power to an AC motor, and more particularly to an AC motor drive device including a power storage system that controls DC power.

BACKGROUND

In an AC motor drive device, while a large drive current flows for acceleration at the time of power running of the AC motor, a regenerative current is generated at the time of deceleration. If such regenerative power of the motor is simply consumed by a resistor and discharged as heat, energy use efficiency deteriorates, which is not desirable.

Conventionally, therefore, a power storage system is put between a DC-operated inverter and an AC-operated inverter, in parallel with the inverters. The energy storage system includes a power storage element such as a large-capacity electrolytic capacitor or an electric double layer capacitor, a DC/DC converter provided between the power storage element and a DC bus of a DC-operated converter, and a control circuit that controls the DC/DC converter to perform charge and discharge between the DC bus and the power storage element.

Specifically, at the time of power running of the motor, power accumulated in the power storage system is supplied to the AC motor via the inverter. On the other hand, at the time of regeneration of the motor, the regenerative power is accumulated in the power storage system via the inverter, thereby leveling a motor drive current and effectively utilizing the regenerative power (see, for example, Patent Literatures 1, 2, and 3).

As the DC/DC converter used in the power storage system, a step-up/step-down bidirectional chopper circuit may be used. The step-up/step-down bidirectional chopper circuit can execute charge control to the power storage element and discharge control from the power storage system to the DC bus with a simple configuration.

CITATION LIST

Patent Literatures

Patent Literature 1: Japanese Patent Application Laid-open No. 2001-103769
Patent Literature 2: Japanese Patent Application Laid-open No. 2001-320893
Patent Literature 3: Japanese Patent Application Laid-open No. 2008-99503

SUMMARY

Technical Problem

However, in the conventional power storage system using the step-up/step-down bidirectional chopper circuit, when a voltage of the DC bus is lower than a voltage of the power storage element, power of the power storage element is self-regenerated toward the DC bus side via a diode, which is in inverse-parallel connection with a switching element of the step-up/step-down bidirectional chopper circuit. Therefore, an energy loss of the power storage element increases.

Furthermore, for example, if a certain type of abnormality that causes a short circuit between the DC buses occurs in the DC power source or the inverter, and the voltage of the DC bus decreases than the voltage of the power storage element, the power storage system becomes a self-discharge state described above. However, because the discharge current flowing through the diode in the inverse-parallel connection with the switching element of the step-up/step-down bidirectional chopper circuit cannot be stopped, a large current flows from the power storage system to the DC bus, thereby causing breakage of the step-up/step-down bidirectional chopper circuit or the like.

The present invention has been achieved to solve the above problem, and an object of the present invention is to provide an AC motor drive device having mounted therein a highly safe power storage system that can improve the energy use efficiency by reducing an energy loss of a power storage element at the time of power regeneration, and that prevents breakage influences such that the power storage element causes breakage in other devices at the time of occurrence of an abnormality.

Solution to Problem

The present invention is directed to an AC motor drive device that achieves the object. The AC motor drive device includes a power storage system that is connected to a DC bus in parallel with an inverter. The inverter converts DC power supplied from the DC bus connected to a DC power supply to AC power required for driving an AC motor, to control DC power of the DC bus. The power storage system includes a power storage element that can store DC power; a step-up/step-down bidirectional chopper circuit that can perform a charge operation from the DC bus side to the power storage element and a discharge operation from the power storage element to the DC bus side; a circuit disconnection element that is provided between the power storage element and the step-up/step-down bidirectional chopper circuit; and a control circuit that controls a charge/discharge operation by the step-up/step-down bidirectional chopper circuit and an open-circuit/short-circuit operation between the power storage element and the step-up/step-down bidirectional chopper circuit by the circuit disconnection element.

Advantageous Effects of Invention

According to the present invention, because a circuit disconnection element that can open or short-circuit between a power storage element and a step-up/step-down bidirectional chopper circuit is provided in a power storage system, it can be prevented that the power storage system becomes a self-discharge state in a charging process. Furthermore, at the time of occurrence of an abnormality, the power storage element can be detached from other devices including the step-up/step-down bidirectional chopper circuit. Therefore, an energy loss of the power storage element at the time of power regeneration can be reduced to improve the energy use efficiency, and at the time of occurrence of the abnormality, breakage influences such that the power storage element causes breakage in other devices at the time of occurrence of abnormality can be prevented, thereby enabling to realize an AC motor drive device having mounted therein a highly safe power storage system.

BRIEF DESCRIPTION OF DRAWINGS

FIG. 7 is a waveform diagram for explaining a charge/discharge control operation performed by the step-up/step-down bidirectional chopper circuit shown in FIG. 5 having the circuit disconnection element according to the embodiment.

FIG. 8 is an example of a circuit that performs an operation determination of open-circuit/short-circuit of the circuit disconnection element shown in FIG. 5.

DESCRIPTION OF EMBODIMENTS

Exemplary embodiments of an AC motor drive device according to the present invention will be explained below in detail with reference to the accompanying drawings. The present invention is not limited to the embodiments.

First Embodiment

Figure 1:
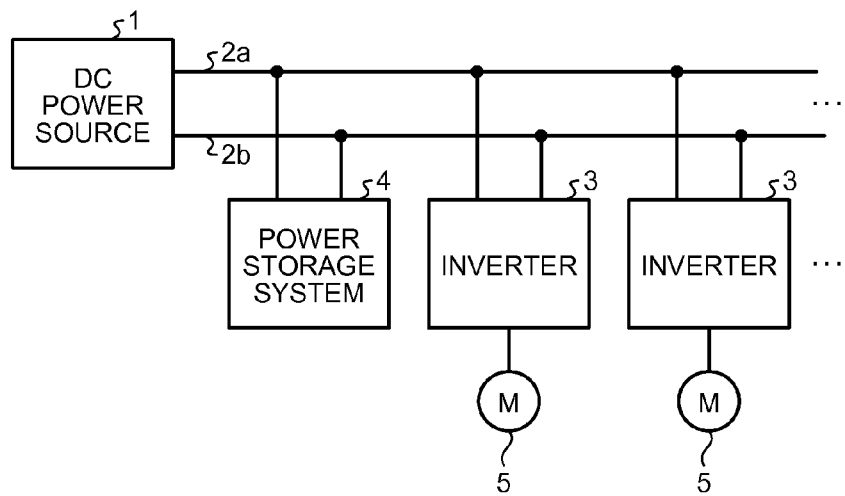
FIG. 1 is a block diagram of a configuration of an AC motor drive device according to a first embodiment of the present invention.

FIG. 1 is a block diagram of a configuration of an AC motor drive device according to a first embodiment of the present invention. In FIG. 1, in the AC motor drive device according to the first embodiment, a plurality of inverters 3, 3, . . . are connected in parallel to positive and negative DC buses 2a and 2b, to which DC power is supplied from a DC power source 1, and a power storage system 4 is connected to the DC buses 2a and 2b between the DC power source 1 and the inverters 3, in parallel with the inverters 3. AC motors 5, 5, . . . are respectively connected to each of the inverters 3, 3, . . . .

The inverters 3, 3, . . . respectively generate desired AC power from the DC power of the DC buses 2a and 2b to drive the respective AC motors 5, 5, . . . . In FIG. 1, a case where there are a plurality of pairs of the inverter 3 and the AC motor 5 is shown. However, there can be only one pair of the inverter 3 and the AC motor 5. Because the power storage system 4 to be mounted is one, the number of pairs of the inverters and the AC motors does not pose any problem at the time of applying the present embodiment. Because the configuration of the inverter 3 is well known, configurations of the DC power source 1 and the power storage system 4 are explained.

Figure 2:
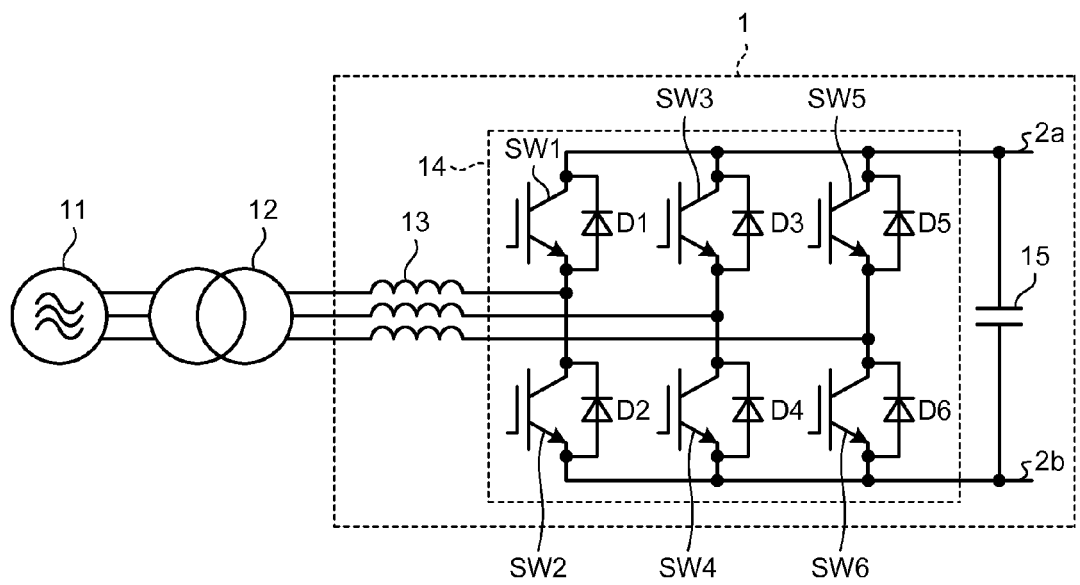
FIG. 2 is a circuit diagram of details of parts related to a DC power source shown in FIG. 1.

FIG. 2 is a circuit diagram of details of parts related to a DC power source shown in FIG. 1. In FIG. 2, the DC power source 1 shown in FIG. 1 includes a reactor 13, a full-wave rectifier circuit 14, and a smoothing capacitor 15.

The full-wave rectifier circuit 14 has such a configuration that three pairs of upper and lower arm switching elements (SW1 and SW2), (SW3 and SW4), and (SW5 and SW6) are connected in parallel. For example, the switching elements SW1 to SW6 are respectively an IGBT, and reflux diodes D1 to D6 are respectively connected in inverse parallel with the switching elements SW1 to SW6.

Respective series connection terminals of the three pairs of upper and lower arm switching elements (SW1 and SW2), (SW3 and SW4), and (SW5 and SW6) connected in series form three-phase AC input terminals. The three-phase AC input terminals are connected to a three-phase AC power source 11 via the reactor 13 and a transformer 12. Opposite ends (parallel connection terminals) of the upper and lower arm switching elements (SW1 and SW2), (SW3 and SW4), and (SW5 and SW6) form DC output terminals (positive output terminals and negative output terminals), and the positive and negative DC buses 2a and 2b are connected thereto.

The full-wave rectifier circuit 14 performs switching of a three-phase AC voltage at a timing at which operations of the switching elements SW1 to SW6 do not overlap on each other, thereby performing rectification. The smoothing capacitor 15 is provided between the positive and negative DC buses 2a and 2b, to smooth the rectified voltage to be output to the positive and negative DC buses 2a and 2b by the full-wave rectifier circuit 14, thereby forming a predetermined DC voltage (a DC power source) between the positive and negative DC buses 2a and 2b.

In the full-wave rectifier circuit 14, in a power regeneration mode in which accumulated regenerative power is discharged from the power storage system 4 to the DC buses 2a and 2b, the switching elements SW1 to SW6 are controlled so that the regenerative power is regenerated to the AC power source 11.

Figure 3:
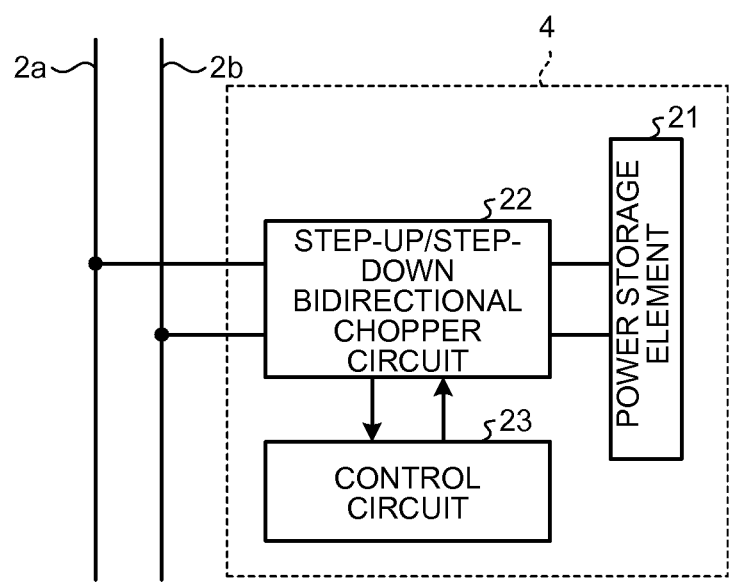
FIG. 3 is a block diagram of a configuration of a power storage system shown in FIG. 1.

FIG. 3 is a block diagram of a configuration of the power storage system shown in FIG. 1. As shown in FIG. 3, the power storage system 4 includes a power storage element 21, a step-up/step-down bidirectional chopper circuit 22, and a control circuit 23.

Figure 4:
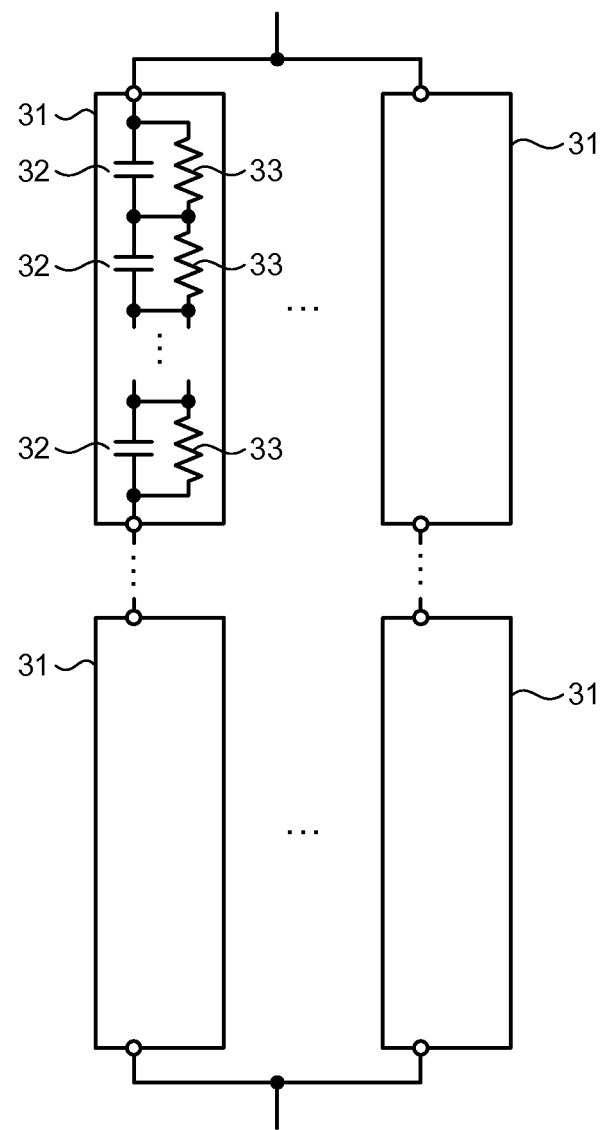
FIG. 4 is a block diagram of a configuration example of a power storage element shown in FIG. 3.

The power storage element 21 is constituted by a large-capacity electrolytic capacitor, an electric double layer capacitor (EDLC), or the like (see FIG. 4). The step-up/step-down bidirectional chopper circuit 22 can perform a bidirectional operation, that is, charge from a side of the DC buses 2a and 2b to the power storage element 21 and discharge from the power storage element 21 to a side of the DC buses 2a and 2b. In the present embodiment, a "circuit disconnection element" is provided between the step-up/step-down bidirectional chopper circuit 22 and the power storage element 21 (see FIG. 5). The control circuit 23 controls the bidirectional operation described above of the step-up/step-down bidirectional chopper circuit 22 according to program control executed by a microcomputer. At this time, in the first embodiment, the control circuit 23 controls open-circuit/short-circuit of the "circuit disconnection element" provided between the step-up/step-down bidirectional chopper circuit 22 and the power storage element 21 (see FIGS. 7 and 8).

FIG. 4 is a block diagram of a configuration example of the power storage element shown in FIG. 3. In FIG. 4, a case where the power storage element 21 is constituted by the electric double layer capacitor (EDLC) is shown. In FIG. 4, the power storage element 21 is used as an EDLC unit in which m×n (m and n are integers equal to or larger than 1) EDLC modules 31, 31, . . . are connected in series and in parallel. Each EDLC module 31 includes a plurality of EDLC cells 32, 32, . . . connected to each other in series, and voltage balance resistors 33, 33, . . . individually connected in parallel with the respective EDLC cells 31, 31, . . . in order to reduce variation in the voltage between the respective EDLC cells 31, 31, . . . .

An electrostatic capacity of the power storage element 21 configured in this manner is as large as, for example, about 1 farad. The electrostatic capacity of one EDLC cell 32 normally exceeds 100 farads; however, the highest voltage is approximately equal to or lower than 3 volts. Because the voltage between the DC buses 2a, 2b is normally 300 volts or 600 volts, the voltage of the power storage element 21 is practically equal to or larger than 150 volts. Although not shown in FIG. 4, the power storage element 21 may include a fuse and a breaker. The voltage balance resistor 33 can be omitted, or can be of another balancing system.

Figure 5:
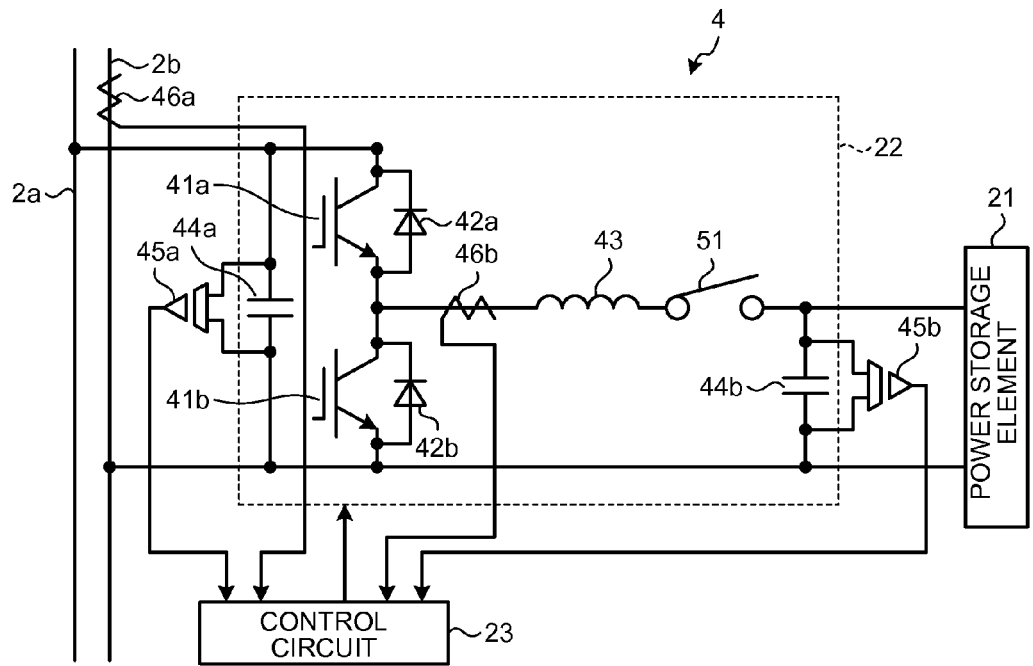
FIG. 5 is a circuit diagram of a specific configuration example of a step-up/step-down bidirectional chopper circuit shown in FIG. 3.

FIG. 5 is a circuit diagram of a specific configuration example of the step-up/step-down bidirectional chopper circuit shown in FIG. 3. Various circuit configurations are known for the step-up/step-down bidirectional chopper circuit 22. However, in the present embodiment, for example, as shown in FIG. 5, the most basic circuit configuration is used.

In FIG. 5, the step-up/step-down bidirectional chopper circuit 22 includes two serially connected switching elements (for example, IGBT) 41a and 41b. Reflux diodes 42a and 42b are connected in inverse parallel with the switching elements 41a and 41b, respectively.

One end of a series circuit of the switching elements 41a and 41b (a collector terminal of the switching element 41a in the example shown in FIG. 5) is connected to the positive DC bus 2a, and the other end of the series circuit of the switching elements 41a and 41b (an emitter terminal of the switching element 41b in the example shown in FIG. 5) is connected to the negative DC bus 2b. A smoothing capacitor 44a is connected to the series circuit of the switching elements 41a and 41b in parallel. That is, the smoothing capacitor 44a is connected between the DC buses 2a and 2b.

One end of a choke coil 43 is connected to the series connection terminals of the switching elements 41a and 41b (a common connection terminal of the emitter terminal of the switching element 41a and the collector terminal of the switching element 41b in the example shown in FIG. 5), and the other end of the choke coil 43 is connected one end of a circuit disconnection element 51 according to the present embodiment. The other end of the circuit disconnection element 51 is connected to one of input/output terminals of the power storage element 21. The other input/output terminal of the power storage element 21 is connected to the negative DC bus 2b, to which the emitter terminal of the switching element 41b is connected. A smoothing capacitor 44b is connected between one and the other input/output terminals of the power storage element 21. The smoothing capacitors 44a and 44b can be omitted.

The voltage of the DC buses 2a and 2b detected by a voltage sensor 45a, the voltage of the power storage element 21 detected by a voltage sensor 45b, a bus current detected by a current sensor 46a, and a current flowing in the choke coil 43 detected by a current sensor 46b are input to the control circuit 23 as reference signals at the time of controlling the step-up/step-down bidirectional chopper circuit 22. Detection values input to the control circuit 23 are not limited to the four values described above. These values are only examples, and other detection values can be input. The detection values can be input from a high-order controller (not shown).

The control circuit 23 generates a gate signal that causes the switching elements 41a and 41b to switch individually based on these detection values, thereby causing the step-up/step-down bidirectional chopper circuit 22 to perform a step-down operation of charging the power storage element 21 by the regenerative power from the motor 5, and a step-up operation of discharging the regenerative power accumulated in the power storage element 21 (power regeneration). At this time, the control circuit 23 controls open-circuit/short-circuit of the circuit disconnection element 51 according to the present embodiment based on these detection values.

The step-up/step-down bidirectional chopper circuit 22 can execute control so that a discharge current from the power storage element 21 becomes constant even while the voltage of the power storage element 21 is higher than the voltage of the DC buses 2a and 2b. Therefore, when discharge from the power storage element 21 to the DC buses 2a and 2b is performed, the control circuit 23 according to the present embodiment is configured to control the step-up/step-down bidirectional chopper circuit 22 so that power regeneration can be performed with a constant current.

If the voltage of the power storage element 21 at the time of starting discharge is lower than the highest voltage at the time of charge, the energy that can be used at the time of regeneration is decreased. When the voltage before discharge of the power storage element 21 is designated as Va, and the voltage after discharge thereof is designated as Vb, usable power P thereof becomes $P=(Va^2-Vb^2)/2$. If the voltage after discharge Vb of the power storage element 21 is constant at the time of extracting the energy accumulated in the power storage element 21, the regeneration use energy by the discharge works with the square of the voltage before discharge Va of the power storage element 21. That is, if the voltage as high as possible is accumulated in the power storage element 21 at the time of starting discharge, the energy use efficiency at the time of power regeneration can be increased.

However, in a step-up/step-down bidirectional chopper circuit having a general configuration in which the other end of the choke coil 43 is connected to one of the input/output terminals of the power storage element 21, without providing the circuit disconnection element 51, when the voltage of the power storage element 21 becomes higher than the voltage of the DC buses 2a and 2b, self-discharge occurs in the DC bus 2a through the reflux diode 42a. Therefore, the voltage of the power storage element 21 at the time of starting discharge is hardly held at a high voltage close to the highest charge voltage. This configuration is explained with reference to FIG. 6.

Figure 6:
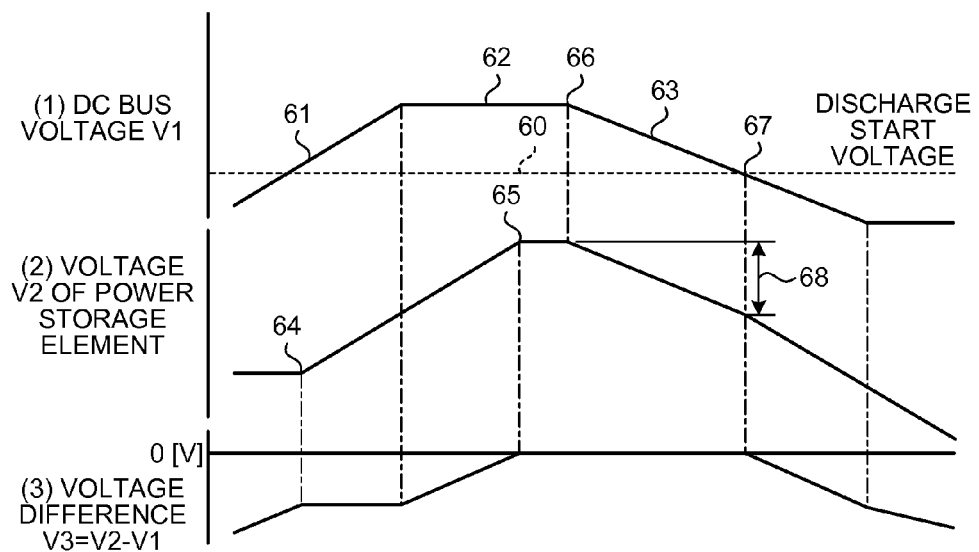
FIG. 6 is a waveform diagram for explaining a charge/discharge control operation performed by a general step-up/step-down bidirectional chopper circuit that does not include a circuit disconnection element according to the embodiment.

FIG. 6 is a waveform diagram for explaining a charge/discharge control operation performed by a general step-up/step-down bidirectional chopper circuit that does not include a circuit disconnection element according to the present embodiment. In FIG. 6, (1) depicts a voltage change of the DC buses 2a and 2b, (2) depicts a charge/discharge operation to and from the power storage element 21 with respect to the change, and (3) depicts a voltage difference indicating the relation between a voltage V1 of the DC buses 2a and 2b and a voltage V2 of the power storage element 21 (V3=V2−V1). Furthermore, a discharge start voltage 60, which is an operation threshold of power regeneration is set with respect to the voltage V1 of the DC buses 2a and 2b.

In (1) of FIG. 6, a period 61 in which the DC bus voltage is rising corresponds to a deceleration period, a period 62 in which the constant voltage is maintained thereafter corresponds to a constant speed period, and a period 63 in which the DC bus voltage is dropping thereafter corresponds to an acceleration period.

In (2) of FIG. 6, in the power storage element 21, charge is started at a timing 64 in an initial stage of the period 61 in which the DC bus voltage is rising. The charge operation is performed until the voltage V2 of the power storage element 21 becomes equal to the DC bus voltage V1. In FIG. 6, a case where the voltage V2 of the power storage element 21 becomes equal to the DC bus voltage V1 at a timing 65 near the end of the period 62 in which the DC bus voltage V1 is constant.

In this case, the DC bus voltage V1 drops from the constant voltage at a timing 66 subsequent to the charge finish timing 65, and thus the state becomes V2>V1. Self-discharge from the power storage element 21 to the DC bus 2*a* then occurs through the reflux diode 42*a*. Therefore, the voltage V2 of the power storage element 21 also drops from the highest charge voltage. At this time, the control circuit 23 can recognize that the current is flowing to the choke coil 43 based on a notification from the current sensor 46*b*; however, the control circuit 23 cannot block the current. That is, the current self-discharged to the DC bus 2*a* through the reflux diode 42*a* continues to flow up to a timing 67 at which the power storage element 21 and the DC bus 2 have the same voltage. Power regeneration is started at the timing 67 at which the DC bus voltage V1 falls below the discharge start voltage 60. The voltage of the power storage element 21 at the timing 67 at the time of power regeneration is a voltage dropped from the highest charge voltage at the timing 66 by a voltage 68, and in the example shown in FIG. 6, it is about 60% of the highest charge voltage. The voltage 68 corresponds to an energy loss. That is, it can be recognized that when a general step-up/step-down bidirectional chopper circuit is used, the use efficiency of the accumulated energy of the power storage element 21 is not good.

Therefore, in the present embodiment, the circuit disconnection element 51 is provided between the step-up/step-down bidirectional chopper circuit 22 and the power storage element 21, and when the voltage of the power storage element 21 becomes higher than that of the DC buses 2*a* and 2*b* during the charge operation in which power regeneration has not been started yet, the control circuit 23 controls the circuit disconnection element 51 to be opened, so that self-discharge to the DC buses 2*a* and 2*b* through the reflux diode 42*a* can be prevented. This configuration is explained with reference to FIG. 7.

FIG. 7 is a waveform diagram for explaining a charge/discharge control operation performed by the step-up/step-down bidirectional chopper circuit shown in FIG. 5 having the circuit disconnection element according to the present embodiment. In FIG. 7, (4) an operation signal of the circuit disconnection element 51 is added to FIG. 6. The "H" level indicates an instruction to control the circuit disconnection element 51 to an open state, and the "L" level indicates an instruction to control the circuit disconnection element 51 to a short-circuit state. In FIG. 7, the circuit disconnection element 51 is in the short-circuit state until the timing 65 at which the voltage V2 of the power storage element 21 becomes equal to the DC bus voltage V1. However, when having determined the state of V2>V1 according to a voltage rise change rate or the like of the power storage element 21 based on the input detection values, the control circuit 23 causes the circuit disconnection element 51 to open at the timing 65.

As a result, because a path of the current self-discharged to the DC bus 2*a* through the reflux diode 42*a* is blocked, occurrence of self-discharge is prevented. Because discharge does not occur, the power storage element 21 holds the highest charge voltage at the timing 65 without causing the voltage V2 to drop. Up to the timing 66, the state of V1=V2 is maintained; however, the DC bus voltage V1 turns to drop at the timing 66. Therefore, as shown in (3) of FIG. 7, a voltage difference V3 becomes a positive voltage, and the voltage V2 of the power storage element 21 is maintained to be higher than the DC bus voltage V1. That is, the highest charge voltage at the timing 65 is higher than the DC bus voltage V1.

Thereafter, at the timing 67 at which the DC bus voltage V1 falls below the discharge start voltage 60, the control circuit 23 causes the circuit disconnection element 51 to change to the short-circuit state, and controls the step-up/step-down bidirectional chopper circuit 22 to perform power regeneration. As shown in (2) of FIG. 7, the power storage element 21 holds the highest charge voltage at the timing 65 until the timing 67, and discharge is performed in this state. Because the energy loss such as the voltage 68 shown in FIG. 6 can be reduced, the energy use efficiency at the time of power regeneration is improved.

FIG. 8 is an example of a circuit that performs an operation determination of open-circuit/short-circuit of the circuit disconnection element shown in FIG. 5. The circuit that performs an operation determination of open-circuit/short-circuit of the circuit disconnection element 51 can be constituted by, for example, as shown in FIG. 8, a comparator 70, a logic inversion circuit 71, and an AND circuit 72. In the comparator 70, the voltage V2 of the power storage element 21 is input to a non-inverting input terminal (+) and the DC bus voltage V1 is input to an inverting input terminal (−).

A discharge desired signal S1 input to the logic inversion circuit 71 is generated by the control circuit 23 based on the various detection values described above. When the signal S1 is at the "H" level, it indicates "discharge required", and at the "L" level, it indicates "discharge unrequired". The output of the logic inversion circuit 71 is input to the other input terminal of the AND circuit 72.

The AND circuit 72 sets the output (a circuit-disconnection request signal S2) to the "H" level when the output of the comparator 70 and the output of the logic inversion circuit 71 are both at the "H" level", so that the circuit disconnection element 51 is controlled to the open state.

In short, in such a state where the discharge desired signal is S1="L" and power regeneration is not performed, when V2>V1 and the output of the comparator 70 is at the "H" level, the circuit-disconnection request signal S2 for controlling the circuit disconnection element 51 to the open state is output from the AND circuit 72. At the time of performing power regeneration, because the discharge desired signal becomes S1="H", the circuit-disconnection request signal S2 for controlling the circuit disconnection element 51 to the short-circuit state is output from the AND circuit 72.

In this manner, according to the first embodiment, in the state where self-discharge occurs, the circuit disconnection element is opened. Accordingly, the power storage element 21 can hold the voltage higher than the accumulated DC bus voltage until the original discharge start timing. Therefore, the energy loss of the power storage element 21 can be reduced, thereby enabling to increase the energy use efficiency at the time of power regeneration.

Second Embodiment

In a second embodiment, when such an abnormality has occurred inside a device that the DC bus voltage is caused to fall below the voltage of the power storage element, or when an abnormal signal is input from outside the device, an example of control such that electrical connection between the power storage element 21 and other devices including the step-up/step-down bidirectional chopper circuit 22 is physically disconnected and blocked is shown. This configuration is explained with reference to FIGS. 1 to 5 appropriately.

As explained with reference to FIG. 6, in a general step-up/step-down bidirectional chopper circuit that does not include the circuit disconnection element 51, when the voltage of the power storage element 21 is higher than the voltage of the DC buses 2a and 2b, self-discharge occurs from the power storage element 21 to the DC bus 2a through the reflux diode 42a. The self-discharge also occurs, for example, when a certain type of abnormality that causes short circuit between the DC buses 2a and 2b occurs in the DC power source 1 or the inverter 3, thereby causing the voltage of the DC buses 2a and 2b to fall below the voltage of the power storage element 21.

Because the discharge current cannot be stopped, a large current continues to flow from the power storage system 4 to the DC buses 2a and 2b. Not only the breakage of the step-up/step-down bidirectional chopper circuit 22 but also breakage influences such as burnout of wiring from the power storage element 21 to a short-circuited portion of a broken device or heat breakage of peripheral circuits or the like due to heating-up of the short-circuited portion is caused.

On the other hand, as shown in FIG. 5, the circuit disconnection element 51 is provided between the step-up/step-down bidirectional chopper circuit 22 and the power storage element 21. Therefore, even if an abnormality that causes short circuit between the DC buses 2a and 2b occurs, the electrical connection between the power storage element 21 and other devices including the step-up/step-down bidirectional chopper circuit 22 can be physically disconnected and blocked by opening the circuit disconnection element 51, thereby enabling to restrict breakage influences described above.

Figure 9:
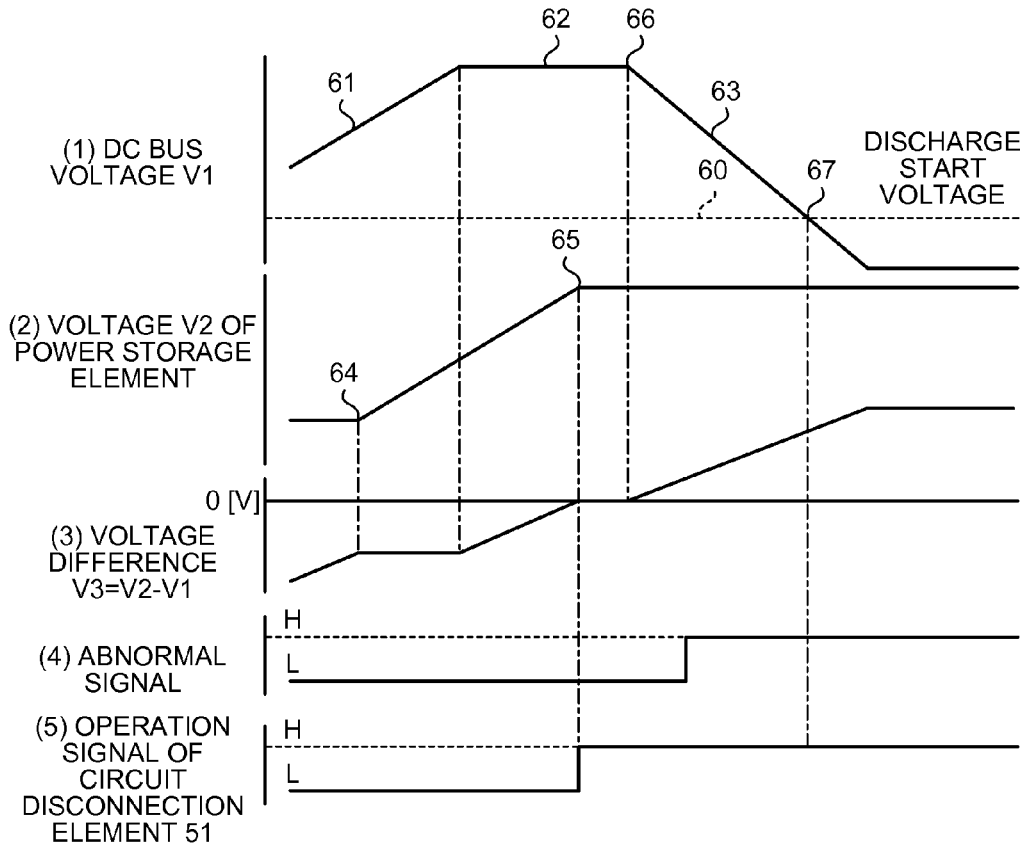
FIG. 9 is a waveform diagram for explaining a charge/discharge control operation performed by the step-up/step-down bidirectional chopper circuit shown in FIG. 5 when an abnormality has occurred as a second embodiment of the present invention.
Figure 10:
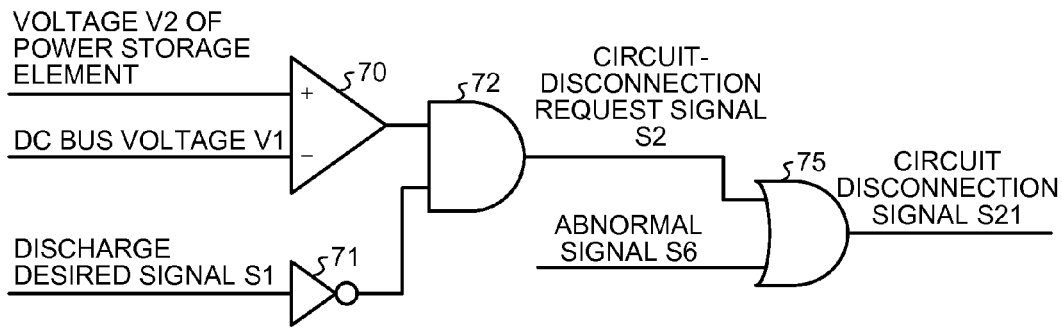
FIG. 10 is an example of a circuit that performs an operation determination of open-circuit/short-circuit of the circuit disconnection element shown in FIG. 5 when an abnormality has occurred.

Specific control contents are explained below with reference to FIGS. 9 and 10. FIG. 9 is a waveform diagram for explaining a charge/discharge control operation performed by the step-up/step-down bidirectional chopper circuit shown in FIG. 5 when an abnormality has occurred, as the second embodiment of the present invention. FIG. 10 is an example of a circuit that performs an operation determination of open-circuit/short-circuit of the circuit disconnection element shown in FIG. 5 when an abnormality has occurred.

In FIG. 9, (1) depicts a voltage change of the DC buses 2a and 2b, (2) depicts a charge/discharge operation to and from the power storage element 21 with respect to the operation, (3) depicts a voltage difference indicating the relation between the voltage V1 of the DC buses 2a and 2b and the voltage V2 of the power storage element 21 (V3=V2−V1), (4) depicts an abnormal signal, and (5) depicts an operation signal of the circuit disconnection element 51.

In FIG. 9, for the convenience of explanation, the characteristic diagram in (1) the voltage change of the DC buses 2a and 2b, (2) the charge/discharge operation to and from the power storage element 21, and (3) the voltage difference (V3=V2−V1) are the same as those in FIG. 7. That is, in the second embodiment, (4) the abnormal signal and (5) the operation signal of the circuit disconnection element 51 are explained.

The abnormal signal indicates that there is an abnormality at the time of the "H" level, and there is no abnormality at the time of the "L" level. The abnormal signal may be generated by the monitoring system in the AC motor drive device or may be input by an external high-order device. Even in the power storage system 4, the control circuit 23 can detect occurrence of an abnormality that causes a drop of the DC bus voltage to become lower than the voltage of the power storage element, based on the detection values of the voltage sensors 45a and 45b and the current sensors 46a and 46b.

In FIG. 9, when the abnormal signal is at the "L" level, the voltage V2 of the power storage element 21 becomes higher than the voltage V1 of the DC buses 2a and 2b at the timing 65, as explained with reference to FIG. 7; however, it is not the start timing of power regeneration. Therefore, the control circuit 23 boosts the operation signal of the circuit disconnection element 51 from the "L" level to the "H" level to control the circuit disconnection element 51 to the open state, thereby preventing occurrence of a current self-discharged to the DC buses 2a and 2b through the reflux diode 42a. In the process in which this state is continued until the power regeneration start timing 67, the abnormal signal rises to the "H" level. Because this state is held, the control circuit 23 continues to hold the operation signal of the circuit disconnection element 51 at the "H" level even at the power regeneration start timing 67.

In this manner, the open state of the circuit disconnection element 51 is continued until the abnormality is eliminated. Therefore, the power storage element 21 can hold the accumulated energy until the abnormality is eliminated, without decreasing the energy.

In FIG. 10, an OR circuit 75 is added to the configuration in FIG. 8. One of the inputs of the OR circuit 75 is an output of the AND circuit 72 (the circuit-disconnection request signal S2), and the other input is an abnormal signal S6. A circuit disconnection signal S21 is output from the OR circuit 75. According to this configuration, when the abnormal signal is at the "L" level, the charge/discharge control shown in FIG. 7 is performed, and when the abnormal signal becomes the "H" level, for example, control shown in FIG. 9 is performed. When the abnormal signal is input from outside, the circuit disconnection element 51 is forcibly controlled to the open state, regardless of the occurrence of self-discharge explained with reference to FIG. 7.

As described above, according to the second embodiment, when an abnormality occurs inside a device, or an abnormal signal is input from outside, the control circuit 23 controls the circuit disconnection element 51 to the open state, so that the power storage element 21 is detached from the step-up/step-down bidirectional chopper circuit. Therefore, an influence applied to the abnormal device when the power storage element 21 is connected can be eliminated, and an AC motor drive device having mounted therein a highly safe power storage system can be obtained.

Furthermore, because the power storage element 21 can hold the accumulated energy without decreasing the energy, the energy accumulated in the power storage element 21 can be efficiently used to the full extent, thereby enabling to improve the energy efficiency of the AC motor drive device.

In the first and second embodiments, the state of the voltage V1 of the DC buses 2a and 2b≤the voltage V2 of the power storage element 21 has been explained as the reference whether to open the circuit disconnection element 51. However, the present invention is not limited thereto, and the circuit disconnection element 51 may not be opened only by the occurrence of the state of V1≤V2 for a short time, and a certain dead zone can be provided in the comparison result between the voltage V1 and the voltage V2, so that the circuit disconnection element 51 is opened when discharge power has a value equal to or higher than a predetermined value.

INDUSTRIAL APPLICABILITY

As described above, the AC motor drive device according to the present invention is useful as an AC motor drive device having mounted therein a highly safe power storage system that can improve the energy use efficiency by reducing an energy loss of a power storage element at the time of power regeneration, and that prevents breakage influences such that the power storage element causes breakage in other devices at the time of occurrence of an abnormality.

REFERENCE SIGNS LIST

1 DC power source
2a, 2b DC bus
3 inverter
4 power storage system
5 AC motor
21 power storage element
22 step-up/step-down bidirectional chopper circuit
23 control circuit
31 EDLC (electric double layer capacitor) module
32 EDLC cell
33 voltage balance resistor
41a, 41b switching element
42a, 42b reflux diode
43 choke coil
44a, 44b smoothing capacitor
45a, 45b voltage sensor
46a, 46b current sensor
51 circuit disconnection element
70 comparator
71 logic inversion circuit
72 AND circuit
75 OR circuit

The invention claimed is:
1. AC motors drive device comprising:
a DC power supply;
a DC bus connected to the DC power supply;
an inverter that converts DC power supplied from the DC bus to AC power required for driving an AC motor; and
a power storage system that is connected to the DC bus in parallel with the inverter to control DC power of the DC bus,
wherein the power storage system includes:
a power storage element that can store DC power;
a step-up/step-down bidirectional chopper circuit that can perform a charge operation from the DC bus side to the power storage element and a discharge operation from the power storage element to the DC bus side;
a circuit disconnection element that is provided between the power storage element and the step-up/step-down bidirectional chopper circuit such that when power regeneration is not required, the circuit disconnection element is in an open state to maintain charge in the power storage element; and
a control circuit that controls a charge/discharge operation by the step-up/step-down bidirectional chopper circuit and an open-circuit/short-circuit operation between the power storage element and the step-up/step-down bidirectional chopper circuit using the circuit disconnection element,
wherein one end of the circuit disconnection element is connected to a choke coil of the step-up/step-down bidirectional chopped circuit and the other end of the circuit disconnection element is connected to one of input/output terminals of the power storage element and wherein the other input/output terminal of the power storage element is connected to a negative DC bus.

2. An AC motor drive device comprising:
a DC power supply;
a DC bus connected to the DC power supply;
an inverter that converts DC power supplied from the DC bus to AC power required for driving an AC motor; and
a power storage system that is connected to the DC bus in parallel with the inverter to control DC power of the DC bus,
wherein the power storage system includes:
a power storage element that can store DC power;
a step-up/step-down bidirectional chopper circuit that can perform a charge operation from the DC bus side to the power storage element and a discharge operation from the power storage element to the DC bus side;
a circuit disconnection element that is provided between the power storage element and the step-up/step-down bidirectional chopper circuit; and
a control circuit that controls a charge/discharge operation by the step-up/step-down bidirectional chopper circuit and an open-circuit/short-circuit operation between the power storage element and the step-up/step-down bidirectional chopper circuit by the circuit disconnection element, and
wherein the control circuit compares a preset operation threshold for power regeneration, a voltage of the power storage element, and a voltage of the DC bus with each other, and when power regeneration is not required, causes the circuit disconnection element to perform a short-circuit operation to control charge to the power storage element; when the voltage of the power storage element exceeds the voltage of the DC bus, or when the voltage of the power storage element exceeds the voltage of the DC bus and discharge power from the power storage element has a value more than a predetermined value, causes the circuit disconnection element to perform an open operation to hold the state circuit disconnection element open until the voltage of the DC bus reaches the operation threshold for power regeneration; and when the voltage of the DC bus has reached the operation threshold for power regeneration, causes the circuit disconnection element to perform a short-circuit operation to control discharge from the power storage element.

3. The AC motor drive device according to claim 1, further comprising a monitoring system, wherein when the monitoring system detects an abnormality, or when an abnormal signal is input from outside of the device, the control circuit performs control to cause the circuit disconnection element to perform the open operation to hold the circuit disconnection element open until the abnormality is eliminated.

4. The AC motor drive device according to claim 1, wherein the control circuit controls open and close state of the circuit disconnection element based on a voltage of the power storage element and a voltage of the DC bus.

5. The AC motor drive device according to claim 1, wherein, when a voltage of the power storage element exceeds a voltage of the DC bus, the circuit disconnection element performs an open operation to hold the state circuit disconnection element open until the voltage of the DC bus reaches a threshold for power regeneration.

6. The AC motor drive device according to claim 1, wherein the circuit disconnection element is in an open state based on an abnormal signal indicating an abnormality in the AC motor drive device and based on a comparison of voltage of the DC bus with voltage of the power storage element and wherein the circuit disconnection element is a switch that when in an open state is not connected to any terminal.

7. The AC motor drive device according to claim 1, wherein, when voltage of the DC bus reaches a threshold for power regeneration, the circuit disconnection element performs a short-circuit operation to control discharge from the power storage element.

8. A power storage system for an AC motor drive device comprising:
- a power storage element configured to store DC power;
- a step-up/step-down bidirectional chopper circuit configured to perform a charge operation from a DC bus side to the power storage element and a discharge operation from the power storage element to the DC bus side;
- a circuit disconnection element positioned between the power storage element and the step-up/step-down bidirectional chopper circuit
- a circuit disconnection element that is provided between the power storage element and the step-up/step-down bidirectional chopper circuit such that when power regeneration is not required, the circuit disconnection element is in an open state to maintain charge in the power storage element; and
- a control circuit that controls a charge/discharge operation by the step-up/step-down bidirectional chopper circuit and an open-circuit/short-circuit operation between the power storage element and the step-up/step-down bidirectional chopper circuit by the circuit disconnection element such that the circuit disconnection element is opened in a state of self-discharge, wherein one end of the circuit disconnection element is connected to a choke coil of the step-up/step-down bidirectional chopped circuit and the other end of the circuit disconnection element is connected to one of input/output terminals of the power storage element and wherein the other input/output terminal of the power storage element is connected to a negative DC bus.

9. The power storage system of claim 8, wherein the power storage element holds a voltage higher than accumulated DC bus voltage until discharge start timing based on the circuit disconnection element.

10. The power storage system of claim 8, wherein opening and closing of the circuit disconnection element is controlled by comparing voltage of a DC bus with voltage of the power storage element.

11. The power storage system of claim 8, wherein, when an abnormality occurs inside an AC motor drive device in which the power storage system is positioned, the circuit disconnection element is switched to an open state so that the power storage element is detached from the step-up/step-down bidirectional chopper circuit.

12. The power storage system of claim 8, wherein the circuit disconnection element is positioned within the step-up/step-down bidirectional chopper circuit comprising a pair of diodes and a smooth capacitor, and a choke coil.

13. The power storage system of claim 8, wherein the circuit disconnection element is a switch which is connected to the power storage element in a closed state and wherein a capacitor monitors voltage output from the circuit disconnection element.

* * * * *